March 10, 1970 A. J. WERNER, JR 3,500,153

CONTROLLER INCLUDING AN AMPLIFIER SYSTEM

Filed April 24, 1967 3 Sheets-Sheet 1

March 10, 1970 A. J. WERNER, JR 3,500,153

CONTROLLER INCLUDING AN AMPLIFIER SYSTEM

Filed April 24, 1967 3 Sheets-Sheet 3

United States Patent Office 3,500,153
Patented Mar. 10, 1970

3,500,153

CONTROLLER INCLUDING AN AMPLIFIER SYSTEM

Alan J. Werner, Jr., Brighton, N.Y., assignor to Sybron Corporation, a corporation of New York Filed Apr. 24, 1967, Ser. No. 633,294
Int. Cl. H02p *1/54, 5/46;* G05b *11/00*
U.S. Cl. 318—18 6 Claims

ABSTRACT OF THE DISCLOSURE

Up to $n$ amplifiers are connected in tandem to form an $n$-fold system. Feedback is taken from the output of each amplifier but the one closest the input signal, to $(n-1)$ summing junctions connected in tandem between the input signal source and the amplifier closest thereto. The summing junction fed back to, by the remotest amplifier, is nearest the signal source, the next nearest is the next most remote amplifier, and so on. At a given value of input signal the most remote amplifier saturates, at a higher value, the next most remote saturates, and so on, so as the signal increases amplifiers saturate, one after the other. When any given amplifier saturates, the unsaturated amplifier nearest it has a sharp increase in its output signal, until it, too, saturates. A pair of parallelled two-fold systems provide a controller controlling a valve, by switching a motor on to open the valve, on to close the valve, or off to hold the valve in position. The inputs to the system are connected by the high resistance of a field effect transistor. The amplifiers more remote from the inputs are set to saturate when one input signal is higher than the other by more than enough to switch the motor on. If such saturation occurs, one of the less remote amplifiers sharply increases its output and thereby causes the field effect transistor to present a low resistance shunting the inputs and therefore limiting the difference between the signals applied to the inputs.

This invention relates to event-discrimination and to limiting, and also to process control systems and to feedback amplifier systems wherein limiting and event-discrimination are desirable.

Various forms of such systems and features are known in the prior art. The systems have input signals applied thereto, and the problems involved include providing limiting of such signals at a certain value, but not at another value, and to discriminate stably and precisely between the occurrences of said values (which occurrences are the events to be discriminated, or represent such events), even where the difference between said values is small. Amplifying systems of one sort and another have been used heretofore to separate the events to be discriminated, but insofar as I am aware, such systems have been unsatisfactory for various reasons.

An input signal and a feedback signal are applied to a summing junction which produces a first signal which is the input signal reduced in value by the value of the feedback signal. The first signal is amplified by a first amplifier which in response produces a second signal which in turn is amplified by a second amplifier which in response produces a third signal. A feedback loop derives said feedback signal from the third signal.

The second amplifier is designed so that it saturates when the said input signal attains a first given value, whereas the first amplifier is designed so that it can amplify, without saturating, said input signal at a second given value greater than said first given value. Each amplifier has feedback-stabilized high gain independently of said feedback loop and of the other said amplifier.

For said input signal at values less than said given value, said second signal values are less than they would be were the said feedback loop disconnected, whereas changes in value of said input signal result in relatively large changes of said third signal. However, if the second amplifier saturates, said second signal now behaves as if the said feedback loop is disconnected for changes in said input signal above said first given value. Hence, change of said input signal from said first given value to said second value results in relatively large changes in said second signal. Said third signal, however, does not increase above the value it had when the second amplifier saturated.

Each of the described large signal change regimes of the second and third signals can correspond to a quite small change in said input signal, and the change in said input signal that results in the second amplifier changing from an unsaturated state to a saturated state can also be quite small. Accordingly, the said large signal change regimes correspond to respective values of input signal that are quite close together. Moreover, said regimes cannot overlap, because the one cannot occur unless saturation of the second amplifier has occurred.

The system can be extended by inserting a second summing junction between the source of said input signal and the first-mentioned summing junction, providing a third amplifier to amplify said third signal and produce a fourth signal in response, and adding a second feedback loop to derive a second feedback signal from said fourth signal and apply it to the second summing junction. The third amplifier is designed to saturate before the second amplifier can, and therefore a third large signal change regime results.

The general property of these systems can be termed discriminating between (or among) events: occurrences of given values of the input signal. When such given value obtains, only one, and always the same, amplifier is producing a signal undergoing a large change regime. This regime obtains for a predeterminably small input signal range, in which the last said given value falls, and cannot overlap any other large change regime.

The two-event system is used in limiting an on-off type controller to which the equivalent of the aforesaid input signal is applied. Thus, the said first given value is one that is supposed to turn the controller on, whereas the second given value is supposed to result in limiting the value of the input signal applied to the controller. The two-event system is incorporated in the controller and designed to discriminate between the two given values which are chosen to be as close together as the discriminating capability of the system will permit.

The limiting is performed by a field effect transistor arranged to shunt the first amplifier, in effect, with its drain to source resistance. The output of the second amplifier provides said second signal in the form of a voltage for the control electrode of the transistor, the second amplifier being designed so that it has to go into its large signal change regime before the said voltage can become large enough to drop the drain to source resistance of the field effect transistor for many megohms to a value that will limit the voltage across said resistance, to the desired value.

Figures 1, 2, 6:
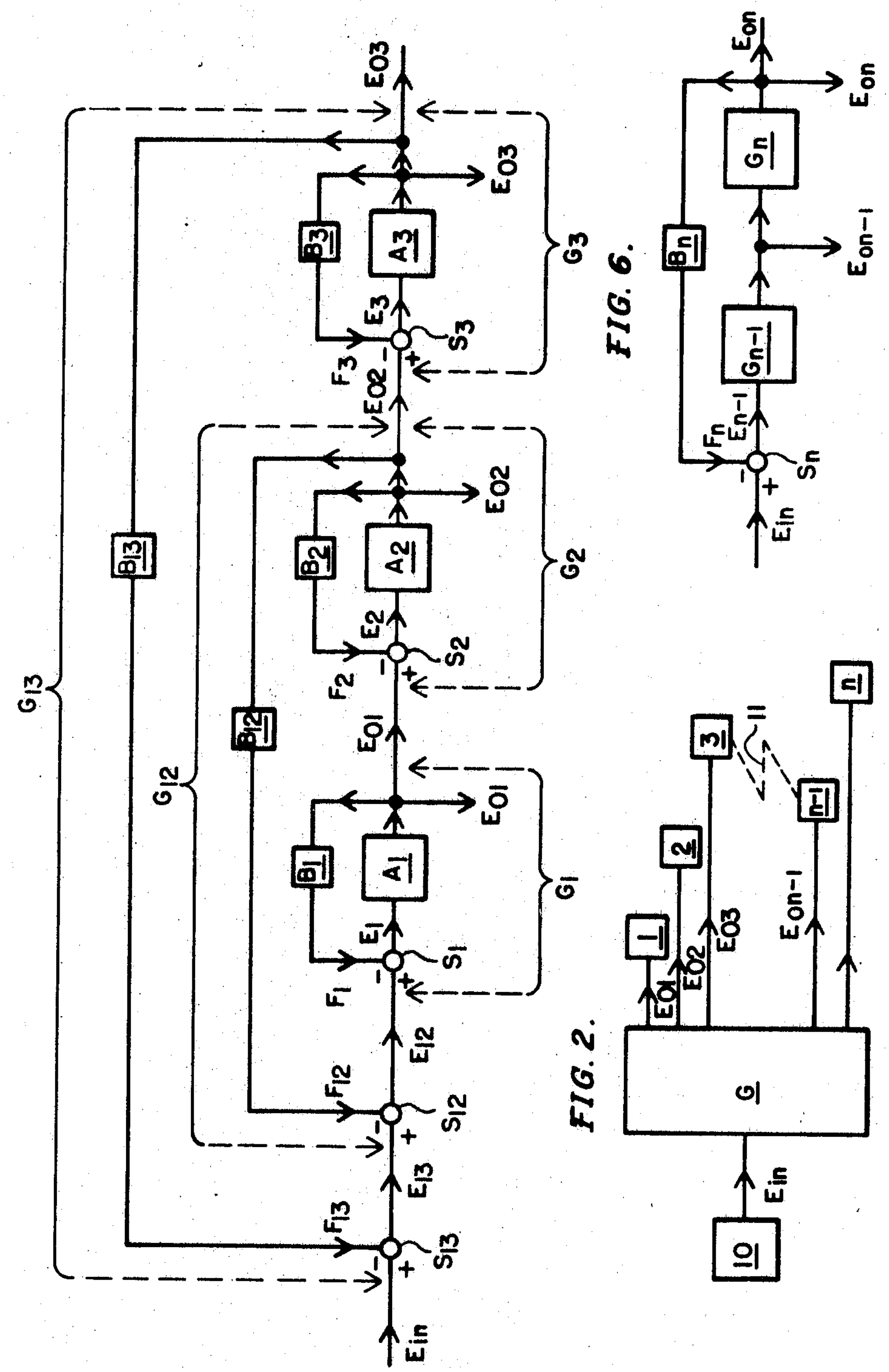
FIGURE 1 is a diagram of a three-fold event discriminating system according to the invention.
FIGURE 2 is a diagram of an $n$-fold event discriminating system according to the invention, with sensors.
FIGURE 6 is a diagram of an $n$-fold event discriminating system visualized on a two-fold basis.

In an amplifier having a fraction B of its output signal $E_{out}$ fed back in opposition to the input signal $E_{in}$ causing the amplifier to produce $E_{out}$, the gain G from input to output, that is, the ratio of output signal to input signal is $$G=\frac{E_{out}}{E_{in}}=\frac{A}{1+BA}\doteq\frac{1}{B} \qquad (1)$$

where A is the open loop gain of the amplifier, that is, the gain that would obtain, but for the feedback. The indicated approximation holds for large enough A. In the system of FIGURE 1, for example, Equation 1 applies to the feedback amplifier subsystem defined by amplifier $A_1$, feedback loop $B_1$, summing junction $S_1$, whose input signal is $E_{12}$ and whose output signal is $E_{01}$. Summing junction $S_1$ has the property that the feedback signal $F_1=BE_{01}$ reduces the signal $E_{12}$ to the value $E_1$, that is to say, assigning a positive sense to $E_{12}$, it is arranged that $F_1$ have a negative sense, and the two signals are algebraically added by junction $S_1$ which applies the resultant sum signal $E_1$ to the amplifier $A_1$.

The foregoing is well understood and its application to the similar feedback amplifier subsystems including amplifiers $A_2$ and $A_3$ is obvious. The brackets and vertical dashed line arrows identify these subsystems as $G_1$, $G_2$ and $G_3$. For convenience, reference characters identifying the feedback loops, amplifiers and subsystems, are the symbols by which the feedback factors, open loop gains, and gains with feedback are expressed mathematically herein. Thus, the gains of the subsystems $G_1$, $G_2$ and $G_3$ are $G_1$, $G_2$ and $G_3$, respectively.

Consider now the subsystem $G_{12}$, composed of subsystems $G_1$ and $G_2$. Here the output signal of subsystem $G_1$ is $E_{01}$, and that of subsystem $G_2$ is $E_{02}$. Further, $$E_{01}=G_1E_{12} \qquad (2a)$$

$$E_{02}=G_2E_{01} \qquad (2b)$$

Equations 2a and 2b show that if gain $G_2$ is large, then $E_{01}$ must be considerably smaller than $E_{02}$. Further, the subsystem $G_{12}$ is defined by the feedback loop $B_{12}$ applying a feedback signal $F_{12}=B_{12}E_{02}$ to a summing junction $S_{12}$ (analogous to junction $S_1$) in opposition to the $G_{12}$ subsystem input signal $E_{13}$ also applied to junction $S_{12}$, and consequently gain $G_1$ also may be large, yet $E_{01}$ will still be considerably smaller than $E_{02}$. In terms of the input signal $E_{13}$ to subsystem $G_{12}$, $$E_{01}=\frac{G_1}{1+B_{12}G_1G_2}E_{13} \qquad (3a)$$

$$E_{02}=\frac{G_1G_2}{1+B_{12}G_1G_2}E_{13} \qquad (3b)$$

Dividing Equation 3a by Equation 3b:

$$\frac{E_{01}}{E_{02}}=\frac{1}{G_2} \qquad (3c)$$

The foregoing supposes that subsystems $G_1$ and $G_2$ are operating in their linear regions, which are considered to obtain unless saturation occurs. According to the invention, however, the system of FIGURE 1 is designed so that saturation occurs in amplifier $A_2$ before it can occur in amplifier $A_1$. That is, there is a given value of signal $E_{13}$ such that signal $E_{12}$ will be large enough to cause subsystem $G_1$ to produce an output signal $E_{01}$ which is large enough to saturate amplifier $A_2$. When amplifier $A_2$ saturates, the magnitude of feedback signal $F_{12}$ can increase no further. Consequently, any increment in signal $E_{13}$ above the said given value is treated as if $G_2$ in Equations 3a, 3b and 3c is zero.

As long as subsystem $G_2$ has not saturated, $E_{01}$ is much smaller than $E_{02}$, as is evident from Equation 3c. Hence, until subsystem $G_2$ saturates $E_{01}$ cannot exceed a value equal to the maximum value of $E_{02}$ divided by gain $G_2$. $E_{02}$, of course, reaches its maximum when subsystem $G_2$ saturates. With gain $G_2$ large, if $E_{01}$ is connected to a sensor which cannot sense a value of $E_{01}$ less than $E_{02}$ divided by $G_2$, then it will be certain that the sensor will not respond to any value of $E_{01}$ that can exist while subsystem $G_2$ is unsaturated.

When subsystem $G_2$ saturates, gain $G_2$ becomes zero in respect of increase in $E_{13}$ above the value required to cause subsystem $G_2$ to saturate, and corresponding increase in $E_{01}$ is equal to $G_1E_{13}$ (as can be ascertained from taking gain $G_2$ in Equation 3a to be zero for such increase in $E_{13}$). In other words, upon saturation of subsystem $G_2$, the gain from $E_{13}$ to $E_{01}$ increases by the factor $(1+B_{12}G_1G_2)$ with respect to the said increase in $E_{13}$. With both of gains $G_1$ and $G_2$ large, such gain increase results in a sudden large increase in $E_{02}$ for a very small increase in $E_{13}$, once subsystem $G_2$ saturates. This allows choice of a sensor for $E_{01}$ that cannot sense $E_{01}$ until it reaches a value that is much larger than any pre-saturation value $E_{01}$ can possibly attain.

The overall system $G_{13}$ is obtained by adding a summing junction $S_{13}$, feedback loop $B_{13}$, and the subsystem $G_3$, to the subsystem $G_{12}$. This makes $E_{13}$ the resultant sum signal of the input signal $E_{in}$ and feedback signal $F_{13}=B_{13}E_{03}$, where $F_{13}$ is the feedback signal due to feedback of output signal $E_{03}$ of subsystem $G_3$. In this system $G_{13}$, subsystem $G_{12}$ plays the rolt of subsystem $G_1$, as described above, and subsystem $G_3$ plays the role of subsystem $G_2$, as described above. Again, amplifier $A_3$ whose input signal is designed to saturate at a lesser value thereof than is produced by amplifier $A_2$ at saturation.

It is easy to see that in terms of the input signal $E_{in}$, there is a value thereof for which amplifier $A_3$ saturates, but amplifiers $A_1$ and $A_2$ do not, and that there is a larger value of $E_{in}$ for which amplifier $A_2$ saturates, but amplifier $A_1$ does not.

Expressing the matter after the fashion of Equations 3a, 3b and 3c, but in terms of $E_{in}$:

$$E_{02}=\frac{G_{12}}{1+B_{13}G_3G_{12}}E_{in} \qquad (4a)$$

$$E_{03}=\frac{G_3G_{12}}{1+B_{13}G_3G_{12}}E_{in} \qquad (4b)$$

$$\frac{E_{02}}{E_{03}}=\frac{1}{G_3} \qquad (4c)$$

It is evident further that system $G_{13}$ can form a subsystem corresponding to subsystem $G_{12}$, and be combined with a further subsystem corresponding to subsystem $G_3$ to form a still higher system than $G_{13}$, which in turn can also be a subsystem combined with a $G_3$-type subsystem to form a yet higher system, and so on, ad infinitum.

Since $G_{12}$ may be written as $$G_{12}=\frac{G_1G_2}{1+B_{12}G_1G_2} \qquad (5)$$

the signals $E_{01}$, $E_{02}$ and $E_{03}$, may be written as follows:

$$E_{01}=\frac{1}{X}G_1E_{in} \qquad (6a)$$

$$E_{02}=\frac{1}{X}G_1G_2E_{in} \qquad (6b)$$

$$E_{03}=\frac{1}{X}G_1G_2G_3E_{in} \qquad (6c)$$

where $X=1+B_{12}G_1G_2+B_{13}G_1G_2G_3$.

Equations 6a, 6b and 6c apply where none of amplifiers $A_1$, $A_2$ and $A_3$ saturate. It is obvious from the equations that $E_{03}$ can be by far the largest output signal, under this condition.

After the amplifier $A_3$ saturates but before saturation of amplifiers $A_1$ and $A_2$, the system equations become:

$$E_{01}=\frac{1}{Y}G_1E_{in} \qquad (E_{01}\doteq 0) \tag{7a}$$

$$E_{02}=\frac{1}{Y}G_1G_2E_{in} \qquad \left(E_{02}\doteq\frac{1}{B_{12}}E_{in}\right) \tag{7b}$$

$$E_{03}=E_{03}\,max. \tag{7c}$$

where $Y=1+B_{12}G_1G_2$. Here again, it is clear that $E_{02}$ can be much larger than $E_{01}$ when amplifier $A_3$ alone is saturated. $E_{03}$, on the other hand, attains its maximum value, and remains there as long as the amplifier is saturated.

Finally, with both amplifiers $A_2$ and $A_3$ saturated but amplifier $A_1$ not saturated:

$$E_{01}=G_1E_{in} \qquad \left(E_{01}\doteq\frac{1}{B_1}E_{in}\right) \tag{8a}$$

$$E_{02}=E_{02}\text{ max.} \tag{8b}$$

$$E_{03}=E_{03}\text{ max.} \tag{8c}$$

If the gains $G_1$, $G_2$ and $G_3$ approach infinity, the approximations indicated parenthetically in the equation systems obtain.

Since the gains $G_1$, $G_2$, $G_3$, $G_{12}$ and $G_{13}$ are determined by feedback, the gain characteristics can be fixed with high stability and accuracy.

I have designated the system of FIGURE 1 an event detecting system. In FIGURE 2, box G illustrates an *n*-fold event detecting system obtained by generalizing the three-amplifier system of FIGURE 1 to higher order systems, in the manner in which the system $G_{13}$ was developed in explaining FIGURE 1.

Thus, system G produces the output signals $E_{01}$, $E_{02}$ and $E_{03}$, in accordance with FIGURE 1. In addition, since G is *n*-fold, there must be *n* output signals in all, two of these being depicted as $E_{on}$ and $E_{on-1}$. Each such output signal is received by a corresponding signal sensor, so that there are *n* sensors, sensors 1, 2, 3, $n-1$ and *n* being shown connected to receive the depicted output signals, and the dashed line 11 symbolizing the remaining sensors corresponding to the non-depicted output signals.

System G receives the signal $E_{in}$ from a suitable source 10. For purposes of illustration, suppose that $E_{in}$ is in the form of a DC voltage varying from zero, say, to some upper value, $E_m$. The events to be detected are the occurrences of various different voltage values, say, in increasing order, $E_n$, $E_{n-1}$, $E_{n-2}$ . . . $E_{m+3}$, $E_{m+2}$, $E_{m+1}$, $E_m$, where the subscripts *m* and *n* are whole numbers, with *m* less than *n*. For simplicity, suppose that $E_{in}$ has increased, ramp fashion, say, to a value between $E_{m+3}$ and $E_{m+2}$. From the description of FIGURE 1, it is intuitively evident that the various amplifiers of the subsystems in the box G have all saturated, except those corresponding to $A_1$, $A_2$ and $A_3$, the principle being that the unsaturated amplifier most remote from the ultimate input signal source, i.e., source 10, must saturate before any other unsaturated amplifier does.

Figure 3:
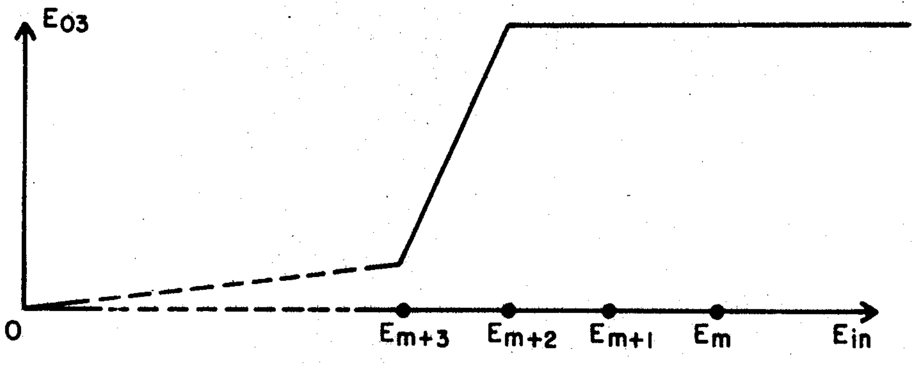
FIGURES 3, 4 and 5 are diagrams illustrating the operation of the system of FIGURE 1.
Figure 4:
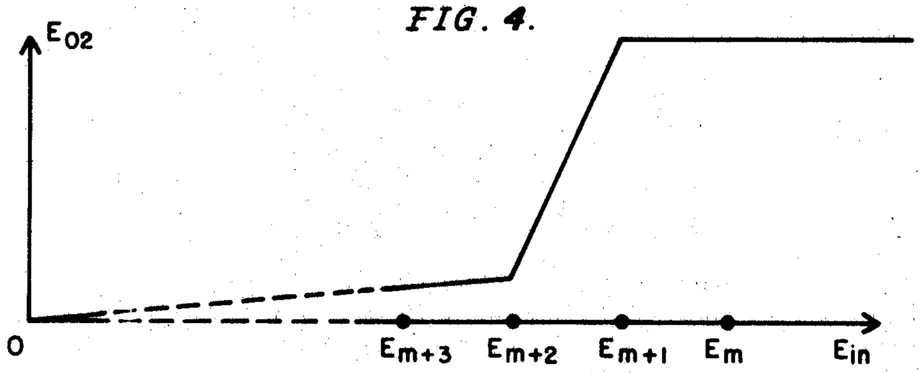
Figure 5:
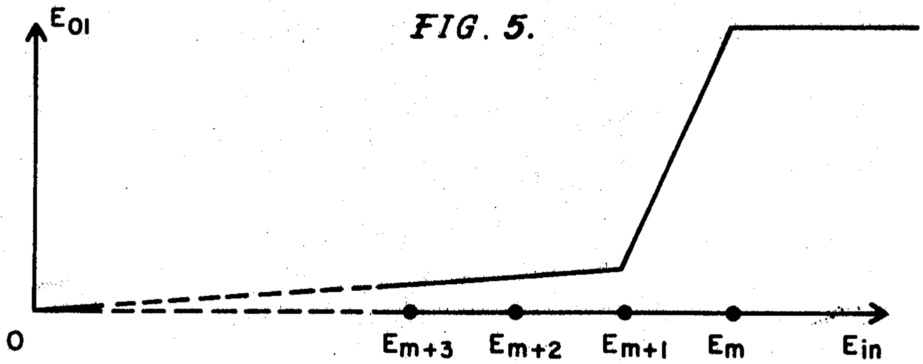

Accordingly, as the input signal changes from $E_{m+3}$ to $E_m$ output signals are changing as shown in FIGURES 3, 4 and 5. Thus, from $E_{in}=0$, $E_{01}$, $E_{02}$ and $E_{03}$ increase at a relatively slow rate, and, just prior to $E_{in}$ becoming $E_{m+3}$, the three output signals are of the same order of amplitude. However, at $E_{m+3}$, the amplifier of the subsystem next following the subsystem of G corresponding to system $G_{13}$ of FIGURE 1, saturates. Accordingly, as indicated in FIGURE 3, output signal $E_{03}$, changes at a much faster rate, since the last said subsystem is now amplifying the change from $E_{m+3}$ to $E_{m+2}$ with a larger effective gain than the change from zero to $E_{m+3}$.

From $E_{m+3}$ to $E_{m+2}$, output signal $E_{02}$ does not increase much, but at $E_{m+2}$, the amplifier corresponding to $A_3$ saturates, and from $E_{m+2}$ to $E_{m+3}$, $E_{02}$, which is the output signal of a subsystem of G corresponding to subsystem $G_{12}$ of FIGURE 1, increases at an increased rate. $E_{01}$ continues to increase moderately until $E_{m+1}$, at which value the amplifier corresponding to $A_2$ saturates, whereupon, $E_{01}$ now begins its rapid increase. It will be observed, further that if $E_m$ saturates the remaining amplifier, i.e., the one corresponding to amplifier $A_1$ of FIGURE 1, its immediate input signal which corresponds to $E_1$ from summing junction $S_1$, FIGURE 1, also undergoes a change in rate of increase, since changes in $E_{in}$ over and above that value needed to saturate the last amplifier (corresponding to amplifier $A_1$) are passed on by the corresponding junction without reduction by feedback. Taking this last effect into account, system G may therefore also be characterized as an $(n+1)$-fold event detecting system.

FIGURES 3, 4 and 5 are, of course, somewhat idealized. For example, the low-rate-of-change sections of the output signal curves would have a somewhat drooped shape, since every time an amplifier saturated there would be a slight increase in the rate of increase of the output signal of the corresponding subsystem. Again, practical amplifiers saturate on a finite change in signal, so there would be a rounding of the knees of the output signal curves.

The events, that is the values of $E_{in}$, to be detected are detected in precisely the order they occur, and never otherwise. In the prior art, this result is ordinarily difficult to secure if the values are close together. With the present invention, however, consecutive events may be spaced by an amount on the order of the signal change needed to cause saturation. For example, if a typical amplifier saturates on 0.5 millivolt change in $E_{in}$, the constants of the system containing the amplifier can be arranged so that one more millivolt or less of change in $E_{in}$, in the same sense as the former change suffices to operate the corresponding sensor of FIGURE 2.

Again, suppose the sensors 2 and 3 are of the type that are relatively indefinite in their operation, for example, an electromagnetic relay which is rated to operate at a certain voltage applied to their solenoids with, however, a tolerance that is larger than the difference between the two values of $E_{in}$ that are to be detected. Such conventional means as have been envisaged heretofore for operating these relays, in general, suffer from stability and accuracy problems. With the present invention, however, inspection of FIGURES 3 and 4 shows that the characteristics of the relays are relatively independent of the values of $E_{in}$. Thus, in terms of voltage, the $E_{in}$ axis could represent a thousand millivolts in all, whereas the output voltage axes could represent a number of volts, six say. Thus, a relay that definitely would not operate at under 2 volts applied thereto, but could not be relied on to operate infallibly unless at least four volts were applied thereto, could be used for sensors 2 and 3 (and any of the other sensors, of course).

It is evident that sensors 1 . . . *n* could be rate of change sensitive devices. In this case, of course, the gain characteristics of the system would have to be such that the slowest rate of change of $E_{in}$ would not decrease the slope of what is shown as the steep parts of the output/input curves, FIGURES 3, 4 and 5, enough that the sensors could not distinguish between the slopes of the two sections of the output/input curves.

The proportions of FIGURES 3, 4 and 5 are consistent with uniform event spacing (supporting the $E_{in}$ axis between 0 and $E_{m+3}$ to have been somewhat compressed), equality of the effective gains corresponding to the steep parts of the output/input curves, and ramp change in $E_{in}$. Choice of system constants and event-spacing, and of manner of change $E_{in}$ are not thus restricted, however, and I am not aware of any restrictions the discussion of which would be material here.

FIGURE 6 epitomizes the *n*-fold system along the lines of FIGURE 1. Looking at FIGURE 1, it will be seen that each of the subsystems $G_1$, $G_2$, $G_3$ and $G_{12}$, and the system $G_{13}$ can be put in a box by itself and called a subsystem. Taking an $n$-fold system, and thus boxing all but the $n$th amplifier, the subsystem $n-1$ results, whose output signal is $E_{on-1}$, which is also the input signal to the $n$th subsystem $G_n$, whose output $E_{on}$ is fed back as signal $F_n$ via loop $B_n$ to summing junction $S_n$, to which $E_{in}$ is also applied, so that error signal $E_{n-1}$, the algebraic sum of $E_{in}$ and $F_n$, is the input signal to subsystem $G_{n-1}$. Supposing subsystem $G_n$ not to have saturated, the analysis previously made for subsystems $G_1$ and $G_2$, that is, the subsystem $G_{12}$, applies to system of FIGURE 6.

Mathematically:

$$E_{on}=G_{1n}E_{in} \quad (8)$$

where $G_{1n}$ is the gain of the system before subsystem $G_n$ saturates, and in general $$E_{on-1}=\frac{G_{n-1}}{1+B_nG_{n-1}G_n}E_{in} \quad (9a)$$

and $$E_{on-1}=\frac{E_{on}}{G_n} \quad (9b)$$

Figure 7:
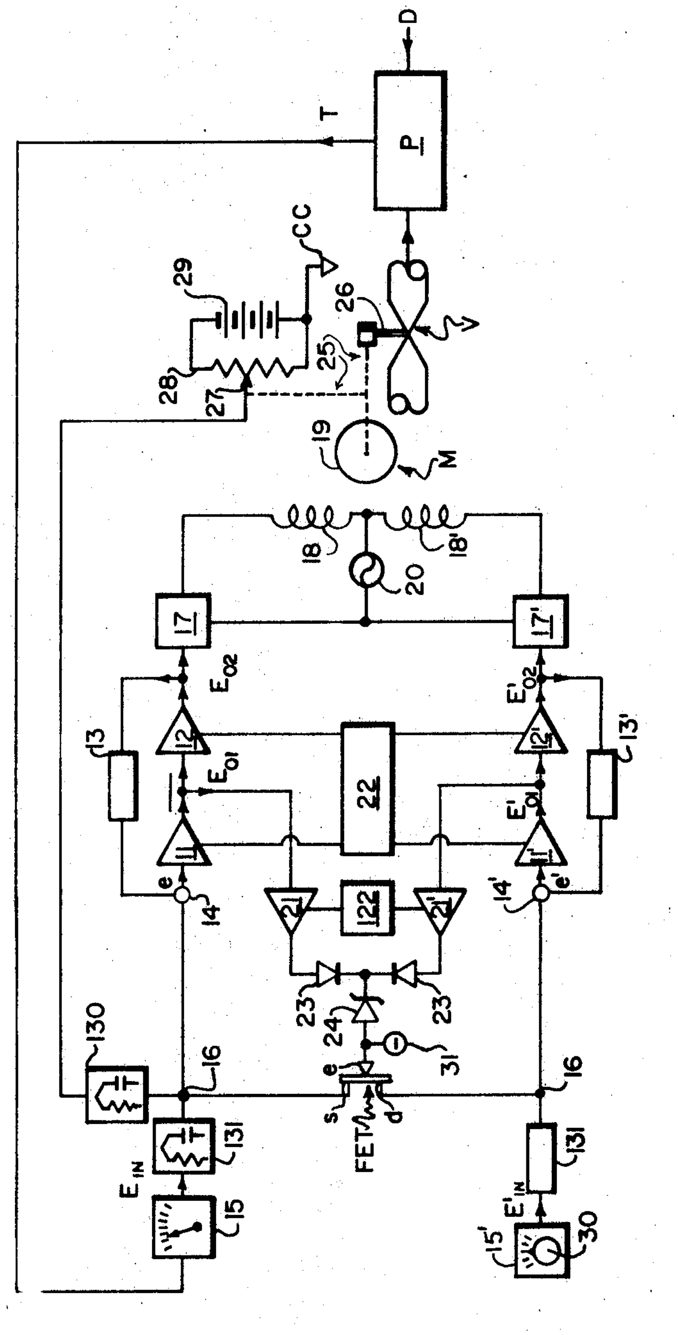
FIGURE 7 is a diagram of a process control system according to the invention.

In FIGURE 7, amplifiers 11 and 12, feedback loop 13 and summing junction 14 define a subsystem like $G_{12}$ of FIGURE 1 (the counterparts of feedback loops $B_1$ and $B_2$ are not shown, but they may be imagined to be inside the amplifier triangles), which is part of an amplifying channel whose input is the voltage output of a DC voltage source 15, and includes a terminal 16, the summing junction 14, amplifier 11, amplifier 12, and switch 17 and one winding 18 of a motor M having a rotating armature 19. Switch 17 controls the energization of winding 18 by a power source 20 (the usual AC mains power, say). Source 15 provides a positive DC voltage—that is to say, $E_{in}$ of FIGURE 1. Ignoring, for the moment, a feedback loop 130 connected to summary junction 16, and switch 17 and winding 18, the just described channel may be supposed to operate like system $G_{12}$ of FIGURE 1. The signal $E_{01}$, a voltage, say, is amplified by an amplifier 21 for reasons that will appear hereinafter.

The system of FIGURE 7 also includes a second amplifying channel, identical to the first, and hence, need not be described separately except to note that reference numerals used to indicate elements of the second channel, are the same as for the first channel, but are primed in order to distinguish between the channels. The second channel's input $E'_{in}$ is the positive DC voltage output of a voltage source 15'.

The two channels are intercoupled by circuitry, denoted in a general way by box 22 and designed to make the channels cooperate as a plural stage differential amplifier. Thus, amplifiers 11 and 11' provide one such stage, and amplifiers 12 and 12' another. This practice is well known in the art and has as its consequence that unless the voltage $E_{in}$ and $E'_{in}$ differ more than by a given amount, called the deadband, neither channel produces an output voltage (other than a negligible residual voltage, due to so-called common-mode effects). On the other hand, should the input voltages differ by more than the deadband, then there will be an output from the channel having the larger input voltage (in this example, the more positive one).

The gain characteristics of the system are designed so that when the deadband is exceeded by a given amount, the channel producing the consequent output voltages, $E_{02}$ or $E'_{02}$, causes the corresponding one of switches 17 and 17' to close, and energize the corresponding one of windings 18 and 18'. If the deadband is not exceeded, neither switch is open, or if the difference between $E_{in}$ and $E'_{in}$ becomes less than the deadband, the corresponding switch opens. Accordingly, the operation of the system is, so far, to open one of switches 17 and 17', to keep both open, to close one of them only, or to keep one closed.

It is obvious that it serves no purpose to let the difference between $E_{in}$ and $E'_{in}$ any larger than is necessary to close one of the switches. The previously-described mode of operation of system $G_{12}$ is now used to limit such difference, as well as to provide switch operation. Thus, each of amplifiers 12 and 12' are set so that it saturates if the difference between $E_{in}$ and $E'_{in}$ exceeds the deadband by a predetermined amount over and above the difference required to cause one of the switches 17 and 17' to close. From what has been said as to system $G_{12}$, it is evident that saturation of one of amplifiers 12 and 12' will be followed by a sharp increase in the corresponding one of voltages $E_{01}$ and $E'_{01}$ which will in turn be amplified by the corresponding one of amplifiers 21 and 21', which are connected through respective diodes 23 and 23', to a Zener diode 24, which in turn is connected to the control electrode *e* of a field effect transistor FET. Transistor FET, in turn, is connected between summing junctions 16 and 16' by means of its drain electrode *d* and its source electrode *s*.

Eeach of amplifiers 21 and 21' has its gain set so that it must produce an output voltage from a value of voltage $E_{01}$ or $E'_{01}$ obtaining during the sharp increasing regime, in order to fire Zener diode 24. The firing voltage of the diode, in turn, is chosen so that when fired, the diode will impress on control electrode *e* a voltage that will reduce the drain to source resistance of the FET to a value sufficiently low to limit the difference between $E'_{in}$ and $E_{in}$ to the desired value. Preferably, intercoupling circuitry 122 is provided that causes the amplifiers 21 and 21' to operate as a differential amplifier, whose deadband is large enough to assure that diode 24 fires only in the sharp increase regime of $E_{01}$ or $E'_{01}$, as the case may be. (The diodes 23 and 23', it is to be remarked, serve to isolate the output ends of amplifiers 21 and 21' from each other.)

In practice, a modest amount of gain in the amplifiers 21 and 21', and the deadband due to their differential connection, allow much leeway as to choice of the gain characteristics of amplifiers 11 and 11' (the gains corresponding to $G_1$, that is to say). Further, unlike amplifiers 11 and 11', there is no need to stabilize amplifiers 21 and 21' which can be of relatively crude and inexpensive design, without any loss of system stability or precision.

As a whole, the system of FIGURE 7 illustrates a process controller in which the limiting feature is of special significance. Thus, mechanical gearing 25, or the like, illustrated as a dashed line, is rotated by armature 19 so as to move the valve stem 26 of a valve V. For purpose of illustration, consider that if winding 18 is energized, armature 19 actuates gearing 25 to move the stem 26 such as to cause the valve to close to an extent proportional to the amount of armature rotation. Say, too, that if winding 18' is energized instead of winding 18, then the armature 19 reverses its direction of rotation, and causes the gearing to move the stem 26 such as to the valve to open to an extent proportional to the amount of reverse rotation of the armature. Finally, it is to be considered that if the armature is standing still, the valve stands open (or closed) to an extent reached the last time the armature stopped rotating.

The valve controls a flow of control agent, say heating fluid, to a process P and influences a temperature therein, that measures some property of the process or its workings, as well as the effect of the heating agent on the process. Thus, this would be a process wherein the temperature is to be kept at some fixed value or set point by controlling the rate at which heating agent is supplied to the process, hence a temperature signal T would be transmitted to the source 15 which in response would produce $E_{in}$ in proportion to the magnitude of the temperature.

The gearing 25 is also shown as moving the slider 27 of a potentiometer 28 connected across a battery 29, the arrangement being that the position of the slider, and therefore of the voltage at the slider is a measure of the amount the valve V is open or closed (its position, as it is often called), which in turn is a measure of the rate at which control agent is being admitted to the process. This measure of valve position is fed back via a loop 130 to terminal 16, and is negative, the arrangement being that if $E_{in}$ is going more positive, the action of the motor M is to drive the voltage at slider 27 more negative, and vice versa, if $E_{in}$ starts becoming less positive.

The source 15' differs from source 15 only in being set independently of the source 15, by hand, as by a manually-operated knob 30.

As thus far described, neither of output $E_{02}$ or $E'_{02}$ will be produced if error signals *e* and *e'* differ by less than the deadband due to differential amplifier characteristics imposed by circuitry 22. The error signals *e* and *e'*, however, reflect the feedback voltage due to loop 13, the feedback voltage due to loop 130 and the voltages $E_{in}$ and $E'_{in}$. Further, the process P is subject to disturbance, indicated at D, meaning any influence on the process temperature other than that due to the control agent, and $E_{in}$ therefore reflects the effect of D, also. The overall tendency of the system is to reduce error signals *e* and *e'* to substantially zero.

Generally speaking, it is desirable to have a certain amount of integrating action, that is to make the rate of supply of control agent reflect both how much the temperature of the system departs from its set point and for how long such deviation lasts. Broadly speaking, the integrating action is a function of the delay between the time the controller calls for a change in valve position and the time the controller can call for a new change. Customarily, both the integrating and proportional action are adjusted by means of various impedances, such as the resistance and capacitance shown in the box representing the feedback loop 130, and/or by means of such impedance represented by box 131. Thus, before feedback from slider 27 can fully counter the charge in $E_{in}$ producing it, it must first charge up the capacitative impedance in the circuitry represented by boxes 130 and 131 (or discharge it, depending on the sense of change in $E_{in}$).

However, due to inherent limitations in the system, the integrating action can get out of hand. For example, the difference between $E_{in}$ and $E'_{in}$ could be large enough to call for the valve V to be more than 100% open or 100% closed, or to be beyond the capacity of slider 27 voltage to reduce it.

Further, $E_{in}$ can change faster than the voltage of tap 27 (motor M is normally a constant speed motor).

In consequence, the system is prone to over-control. That is, if an increase in control agent is called for, the controller causes the valve to supply too much, or too little, if decrease be called for. For practical purposes, some degree of overcorrction may be admitted, but it can be overdone, even to the extent that each change in control agent supply evokes a still larger change in the opposite sense.

In the present invention, the discriminating characteristics of the invention are used to make the controller operate without any over-control tendencies. For these purposes, event *a* is the least difference between $E_{in}$ and $E'_{in}$ that will exceed the corresponding deadband and cause one of the switches 17 and 17' to close. Event *b*, on the other hand, is the same difference plus just so much more, as is enough to cause saturation of the appropriate one of amplifiers 12 and 12' and produce a difference in voltage exceeding the deadband of the differential arrangement of amplifiers 21 and 21', and capable of being amplified thereby enough to fire diode 24. Up to this point, the many megohms of drain to source resistance of the FET have kept the FET from having any effect on the difference between $E_{in}$ and $E'_{in}$. When diode 24 fires, however, drain to source resistance drops to a low value, much lower than the resistance due to the other circuitry (not shown) which it parallels. The drop is chosen to be such that the low value of FET resistance substantially prevents $E_{in}$ from exceeding (or dropping below) $E'_{in}$ by more than enough to ultimately fire diode 24.

In actual values, it is not difficult to adjust the deadband to 0.5 millivolt plus or minus ten percent, and to set the gain characteristics of the system such that if the difference between $E_{in}$ and $E'_{in}$ becomes as high as 1.5 to 2.0 millivolts, one of switches 17 and 17' is on and FET is limiting. The expectable range of $E_{in}$ is generally many times these few millivolts, one volt, for example, but the stability and accuracy of discrimination is not affected by the level of $E_{in}$.

The FET is uniquely suited to limiting here, since it has practically zero offset voltage, as contrasted to the ordinary bipolar transistor. This assures that the FET is substantially a pure resistance and does not introduce any voltages of its own into the input of the controller. Further, its impedance in its high resistance state is so high that the controller can have an input stage that also uses FET's. Again, drain and source connections can be interchanged, without significantly affecting the symmetry of the limiting, even with FET's whose drain to source resistance for a given polarity of voltage is different from its source to drain resistance, since the difference is generally too slight to be significant. The FET should have its control electrode negatively biased by a source 31 of negative voltage to increase drain to source resistance during the times Zener diode 24 is in the unfired state.

Those skilled in the art will be aware that each of the discriminating systems, namely: amplifiers 11 and 12, etc., of one channel, and the corresponding elements in the other channel, are merely stages in their respective channels, each of which may contain more stages than shown, ahead of and/or behind the disminating systems. In other words, each discriminating system is basically a pair of consecutive stages in a channel, to which pair the principles of FIGURE 1 can be conveniently applied. In short, save for the discriminating and limiting features, the system of FIGURE 7 is a conventional sort of process control system.

The various voltages mentioned in explaining FIGURE 7 are to be understood as being measured with respect to a common reference: circuit common as it is often called. This is illustrated in the case of the slider of potentiometer 28, where it will be seen that slider voltage is negative with respect to circuit common CC. All other voltages and their polarities are to be so understood, also.

In the system of FIGURE 7, system gain, namely the ratio of $E_{01}$ or $E'_{02}$ to the difference between $E_{in}$ and $E'_{in}$ would normally be relatively high, for the purpose of activating switches 17 and 17'. Each of switches 17 and 17' would usually be an electromagnetic relay insensitive enough not to be actuated by any value of $E_{02}$ and $E'_{02}$ as might exist while the difference between $E_{in}$ and $E'_{in}$ does not exceed the deadband. On the other hand, the change in $E_{02}$ or $E'_{02}$ arising when such difference exceeds the deadband must be large enough to assuredly activate the corresponding switch. The idea implied by this sort of operation is that $E_{02}$ or $E'_{02}$ is either suitably large, or is small nough to be neglected, but nothing in between.

Actually, the switches 17 and 17' might represent some means to control the rotation speed of motor M or its net rotation from some reference position at which the valve V is half open, to a value proportional to the value of $E_{02}$ or $E'_{02}$. This would allow constructing each of loops 13 and 13' after the fashion of loop 130 and eliminating loop 130 and its source of feedback voltage. In this case, amplifiers 12 and 12' would be designed to amplify the difference between $E_{02}$ and $E'_{02}$ over a given range, and set to saturate at a value of $E_{02}$ or $E'_{02}$ corresponding to a certain maximum speed in either direction or to valve V attaining either of its limits (which are: fully closed and fully open). In this version of FIGURE 7, the limitations of motor M do not influence the feedback of information as to valve position, for $E_{02}$ or $E'_{02}$ is more or less an instantaneous prediction of what the position of the valve is going to be. It nonetheless is important, as is well known, that if such prediction is that the valve is going to become fully open or fully closed, then the difference between $E_{in}$ and $E'_{in}$ should be prevented from further increase.

Numerous modifications and uses of my invention will occur to those skilled in the art. For example, in my copending application entitled, "Process Controller," SN 584,875, filed Oct. 6, 1966, the controller shown in FIGURE 1 thereof is of the type illustrated in FIGURE 7 of the present application, and the relay A of said controller could be constructed in accordance with the principles of FIGURE 7 hereof so as to provide limiting as well as dual mode control.

Again, the event-discriminating principle, FIGURES 1, 2 and 6 hereof, has the basic character of analog to digital conversion. Thus, in FIGURE 2, if $E_{in}$ is continuous, the system G operates the sensors 1 . . . *n* at discrete values of $E_{in}$, so that if the system G is constructed so that the sensors operate at equi-spaced values of $E_{in}$, each sensor corresponds to one and only one integer-multiple of the spacing, and vice versa.

It is also to be noted that the differential amplifier principle applied in FIGURE 7 hereof is exemplified in relay B, FIGURE 5 of said copending application. Reference may also be had to Differential Amplifiers, R. D. Middlebrook, John Wiley and Sons, Inc., 1963.

The designations of certain entities as "amplifiers" is not to be construed as limiting. As is well known, an "amplifier" may be anything from a single transistor or equivalent element, to a complicated assemblage of such elements. It is also to be understood that whatever the nature of the amplifiers, the subsystems and the feedback loops, their design will be such that the feedback signals at the summing junctions are negative in that their sense is such as to reduce $E_{in}$ and its counterparts.

I claim:

1. A controller including a pair of amplifier systems, a pair of switches, a pair of input signal sources, a pair of sensors, a limiter means and a control device; one said source providing one input signal to one said amplifier system, the other said source providing another input signal to the other said amplifying system; means connecting one said second output signal to one said switch, means connecting the other said second output signal to the other said switch, and means connecting each said switch to said control device; said control device exerting a control effect and being actuated by said one said switch to vary its control effect when said one said switch receives second output signal above a predetermined value, but also being actuated by said other said switch to oppositely vary its control effect when said other said switch receives second output signal above a predetermined value; said systems being constructed and arranged such that neither system produces a second output signal above the corresponding said predetermined value unless the value of said one input signal differs from the value of said other input signal by a certain amount, and so that only the system having the larger input signal is producing second output signal $$E_{on}=E_{in}G_{1n}$$

where $E_{in}$ is the difference between said input signals; each said first amplifier subsystem being constructed and arranged such that it saturates if it is producing $E_{in}G_{1n}$ and said difference exceeds said certain amount to predetermined extent; one said sensor being connected to receive one said first output signal and the other said sensor being connected to receive the other said first output signal, each said sensor being constructed and arranged so as to sense only such value of first output signal as exists when said difference exceeds said certain amount to said predetermined extent; said limiter being connected to said sources and to said sensors, and being actuatable to limit the difference between said input signals in response to either one of said sensors sensing a value of first output signal; and each said amplifier system comprising: a first amplifier subsystem having gain $G_{n-1}$, a second amplifier subsystem having gain $G_n$, and a summing junction constructed and arranged to produce error signal $E_{n-1}$, in response to an input signal; means for applying said input signal to said summing junction, means for applying said error signal to said first amplifier subsystem, and said first amplifier subsystem being responsive to said error signal to produce first output signal $E_{on-1}=G_{n-1}E_{n-1}$, means for applying said first output signal to said second amplifier subsystem, and said second amplifier subsystem being responsive to said first output signal to produce a second output signal $$E_{on}=G_nE_{on-1}=G_nG_{n-1}E_{n-1}$$

and means for feeding back a feedback signal equal to a fraction of said second output signal to said summing junction so that $E_{n-1}$ is the difference between the magnitudes of said input signal and said feedback signal; and so that said system has the system gain $G_{1n}$ and produces second output signal $E_{on}=E_{in}G_{1n}$; said first amplifier subsystem being constructed and arranged so as to be able to amplify a given value of said error signal $E_{n-1}$ without saturating, and said second amplifier subsystem being constructed and arranged to saturate in response to said first output signal when said error signal $E_{n-1}$ has said given value.

2. The controller of claim 1, wherein said control device is constructed and arranged to vary its said control effect at a fixed rate.

3. The controller of claim 2, including a feedback element negatively feeding back a measure of control effect such as to reduce the value of one of said input signals, said feedback element having signal storing capacity.

4. The controller of claim 1, including a feedback element negatively feeding back a measure of control effect such as to reduce the value of one of said input signals, said feedback element having signal storage capacity.

5. The controller of claim 1, said sensors each being a source of voltage, and each said first amplifier subsystem being constructed and arranged to produce its said first output signal as a function of the difference between the magnitudes of the signals of said input signal sources; said limiter means including a field effect transistor having its resistance connected between said voltage sources via its drain and source electrodes, and each of said sensors being constructed and arranged so that it senses output signal by producing an output voltage at the control electrode of said transistor such as to reduce said resistance to a low value.

6. The controller of claim 5, including a Zener diode having one electrode connected to said gate electrode, wherein each said sensor is an amplifier having a diode conducting its output voltage to the other electrode of said Zener diode, said Zener diode being connected such as to be non-conducting to said output voltage unless the latter exceeds the breakdown voltage of said Zener diode.

References Cited

UNITED STATES PATENTS 2,796,569 6/1957 McDonald et al.
2,905,877 9/1959 Ciscel.

B. DOBECK, Primary Examiner

U.S. Cl. X.R.

318—28; 330—100

PO-1050
(5/69)

UNITED STATES PATENT OFFICE
CERTIFICATE OF CORRECTION

Patent No. 3,500,153 Dated March 10, 1970

Inventor(s) Alan J. Werner

It is certified that error appears in the above-identified patent and that said Letters Patent are hereby corrected as shown below:

Column 4, line 29 "rolt" should read --roll--.
Column 6, line 65 "supporting" should read --supposing--.
Column 7, line 31 "and" should read --a--;
line 37 "summary" should read --summing--.
Column 8, line 21 "Eeach" should read --Each--.
Column 9, line 56 "overcorrction" should read --overcorrection--.
Column 10, line 37 "disminating" should read --discriminating--;
line 63 "nough" should read --enough--.

Signed and sealed this 30th day of March 1971.

(SEAL)
Attest:

EDWARD M.FLETCHER,JR.
Attesting Officer

WILLIAM E. SCHUYLER, JR.
Commissioner of Patents